United States Patent [19]

Yamamoto et al.

[11] 4,456,844

[45] Jun. 26, 1984

[54] SUBMERGIBLE MOTOR CONSTRUCTION

[75] Inventors: Sakuei Yamamoto; Mitsuhiro Nishida, both of Fukuoka, Japan

[73] Assignee: Mitsubishi Denki Kabushiki Kaisha, Tokyo, Japan

[21] Appl. No.: 545,610

[22] Filed: Oct. 27, 1983

Related U.S. Application Data

[63] Continuation of Ser. No. 336,702, Jan. 4, 1982, abandoned.

[30] Foreign Application Priority Data

| Jan. 17, 1981 | [JP] | Japan | 56-6625 |
| Jan. 17, 1981 | [JP] | Japan | 56-6626 |
| Jan. 17, 1981 | [JP] | Japan | 56-6627 |

[51] Int. Cl.³ .............................................. H02K 5/10
[52] U.S. Cl. ...................................... 310/87; 310/43; 310/71; 310/72
[58] Field of Search ...................... 310/87, 71, 72, 43

[56] References Cited

U.S. PATENT DOCUMENTS

| 2,668,925 | 2/1954 | Bloser | 310/43 |
| 2,817,793 | 12/1957 | Tudbury et al. | 361/33 |
| 3,040,212 | 6/1962 | Hermann et al. | 361/40 |
| 3,631,275 | 12/1971 | Conrad | 310/71 |
| 3,997,232 | 12/1976 | Dunaway | 339/94 R |
| 4,234,902 | 11/1980 | Fujiwara et al. | 361/126 |
| 4,283,645 | 8/1981 | Hofmann | 310/87 |

Primary Examiner—J. D. Miller
Assistant Examiner—D. L. Rebsch
Attorney, Agent, or Firm—Oblon, Fisher, Spivak, McClelland & Maier

[57] ABSTRACT

A mold type motor comprises a molded resin frame covering the surfaces of a stator iron core and a coil end and molded resin brackets detachably fitted on the end openings of the molded resin frame wherein a surge absorber unit is embedded in the molded resin frame and is electrically connected to a grounding element.

3 Claims, 9 Drawing Figures

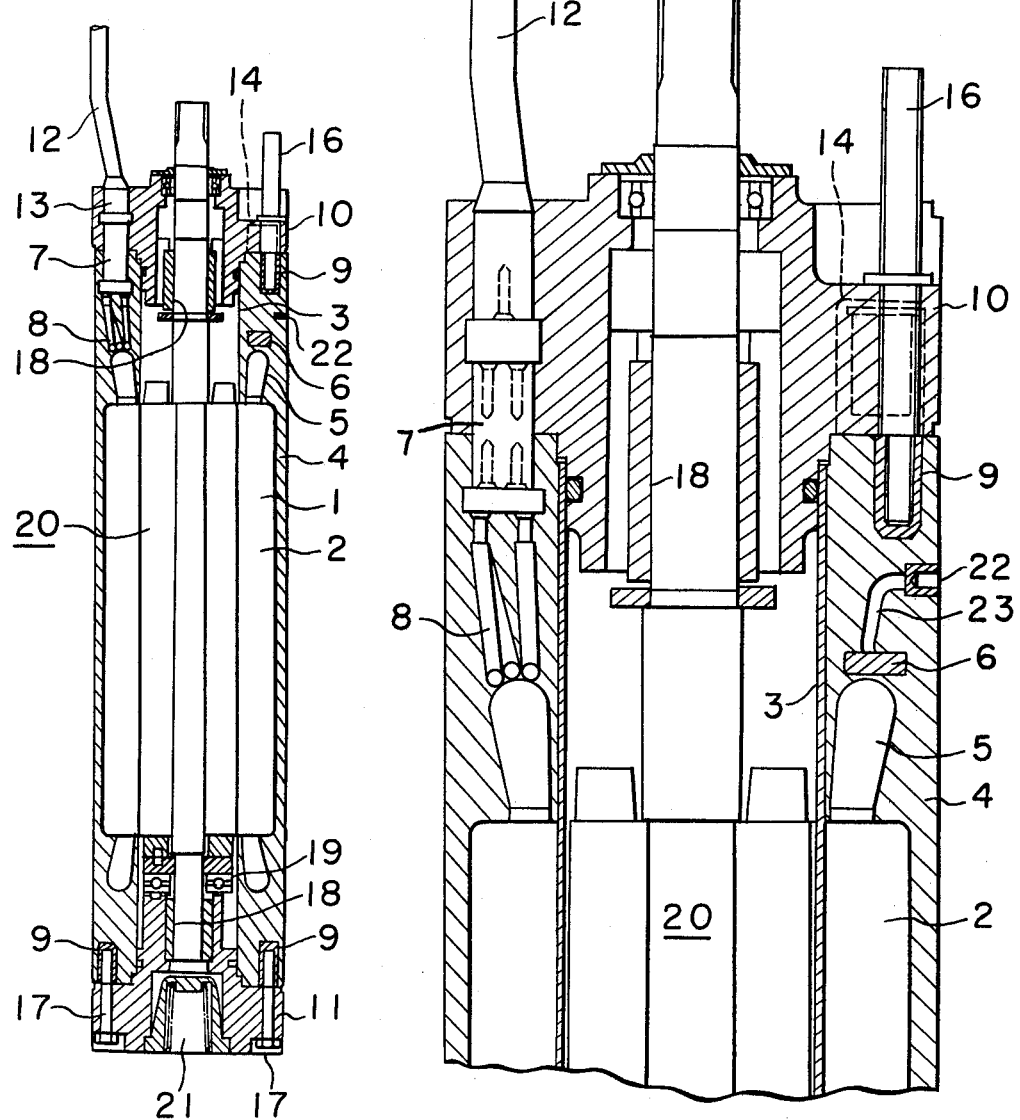

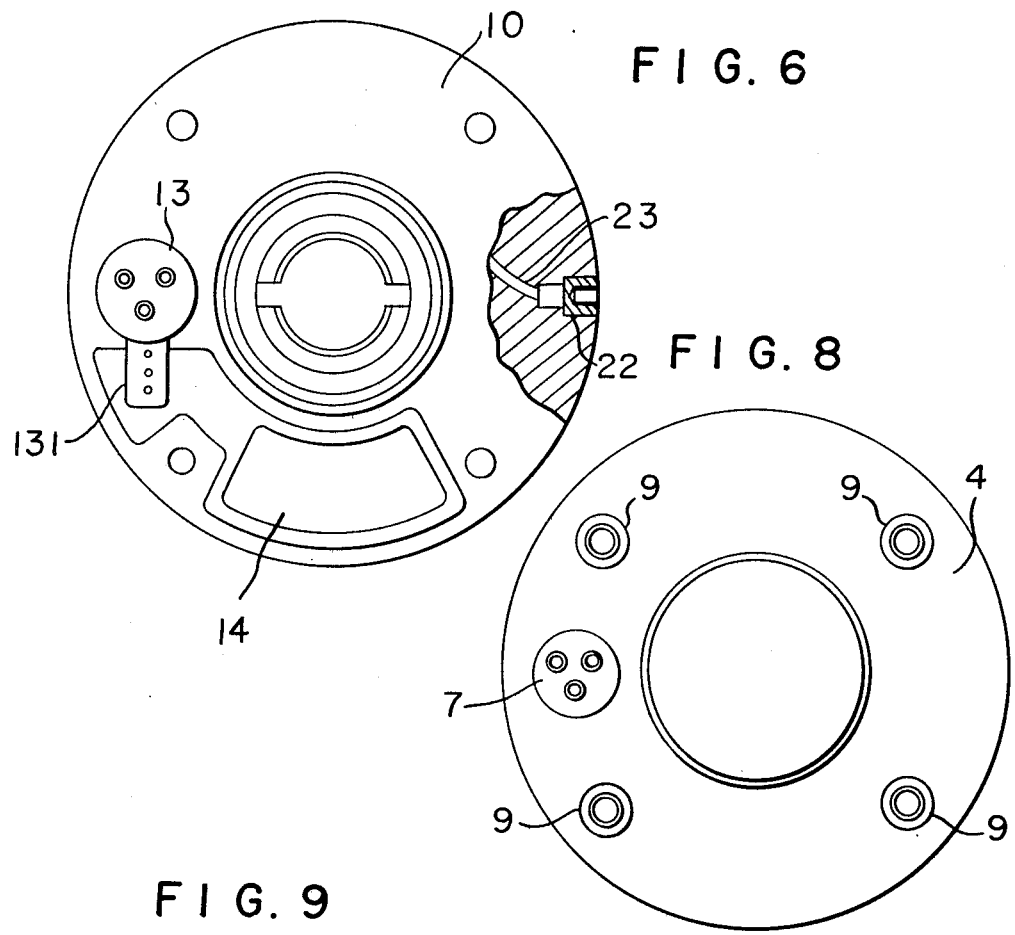
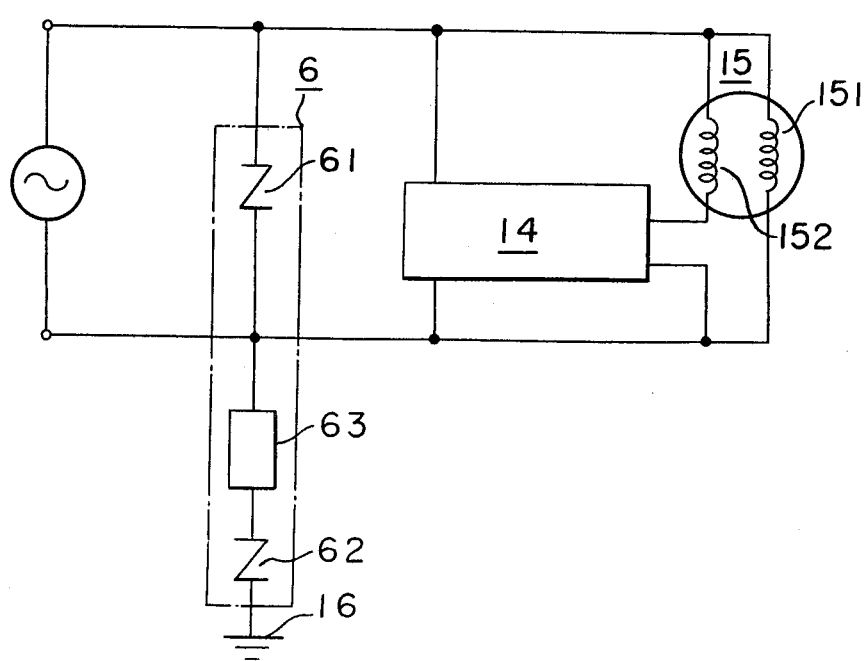

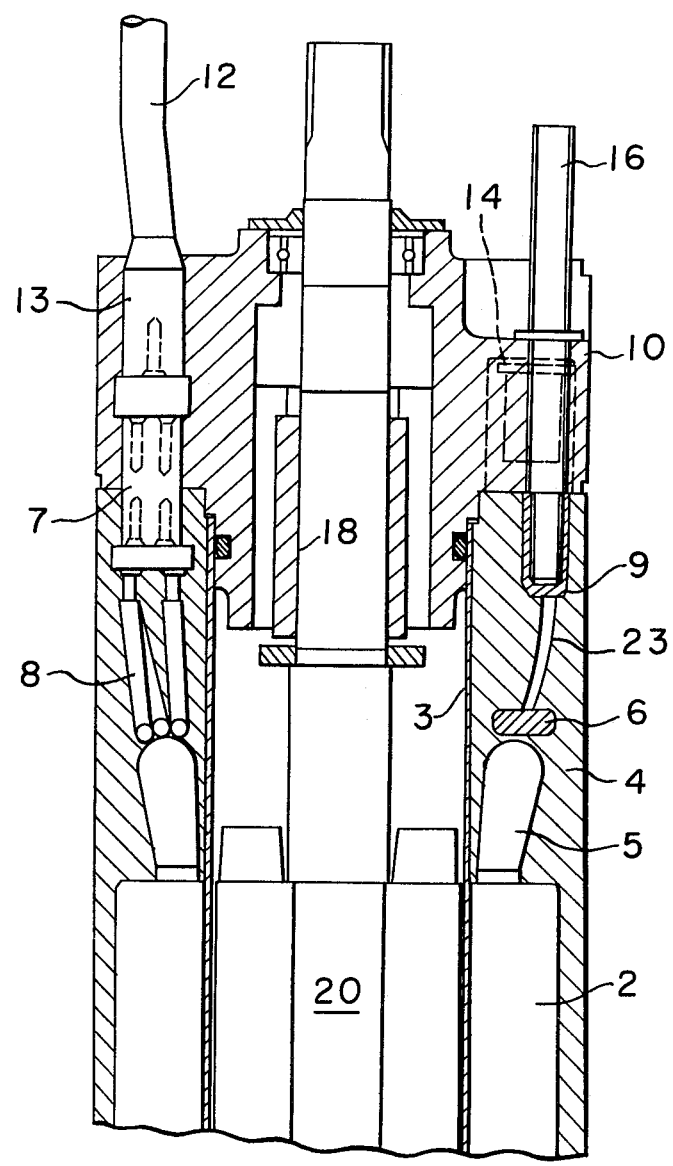

SUBMERGIBLE MOTOR CONSTRUCTION

This application is a continuation, of application Ser. No. 336,702, filed Jan. 4, 1982, now abandoned.

BACKGROUND OF THE INVENTION

1. Field of the Invention

The present invention relates to an improvement in a mold type motor having a surge absorber. More particularly, it relates to a submergible motor for a well.

2. Description of the Prior Art

In a known submergible motor, called a canned type motor, stainless steel cylinders are respectively fitted on the outer and inner surfaces of a stator iron core and a liquid lubricant for a thrust bearing is sealed in the inner cylinder.

Although the canned motor has excellent insulating properties for a stator coil, it has the following disadvantages. The number of parts is increased because it is necessary to provide flanges for closing the end portions of the inner and outer cylinders and for fixing a bracket. It is also necessary to carry out a machining operation for the flanges in order to shape fitting parts for both the cylinders whereby assembling operations are increased to thereby cause an increase in manufacturing cost.

SUMMARY OF THE INVENTION

It is an object of the present invention to overcome the disadvantages of the conventional mold type motor and to provide an improved mold type motor having a simple structure to be easily assembled.

The foregoing and other objects of the present invention have been attained by providing a mold type motor comprising a molded resin frame covering the surfaces of a stator iron core and a coil end and molded resin brackets detachably fitted on the end openings of the molded resin frame wherein a surge absorber unit is embedded in the molded resin frame and is electrically connected to a grounding element.

BRIEF DESCRIPTION OF THE DRAWINGS

FIG. 1 is a longitudinal sectional view of an embodiment of the mold type motor of the present invention;

FIG. 2 is a partly enlarged sectional view of an embodiment of the molded resin frame of the mold type motor;

FIG. 6 is a partly sectioned plan view of the molded resin frame of FIG. 5;

FIG. 7 is a sectional view of a still another embodiment of the mold type motor of the present invention;

FIG. 8 is a plan view of the frame; and

FIG. 9 is a schematic electric diagram of the mold type motor shown in FIG. 7.

The same reference numbers designate the same or corresponding part in the Figures.

DETAILED DESCRIPTION OF THE PREFERRED EMBODIMENTS

Several embodiments of the present invention will be described with reference to drawings.

Figure 3:
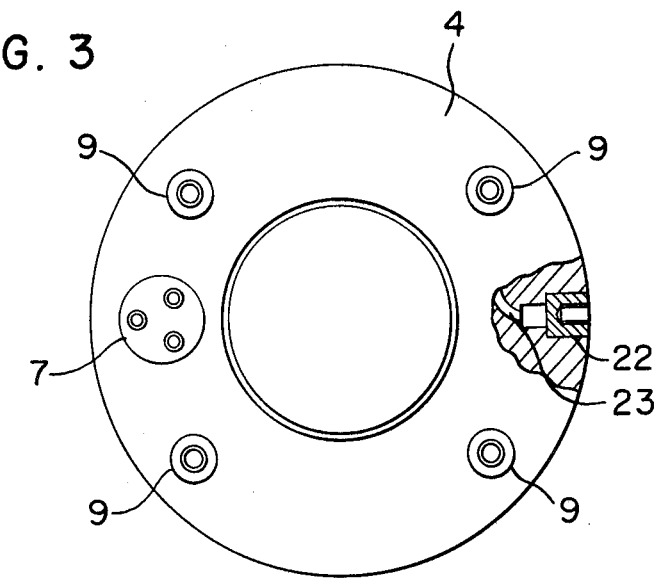
FIG. 3 is a partly sectioned plane view of the molded resin frame.
Figure 4:
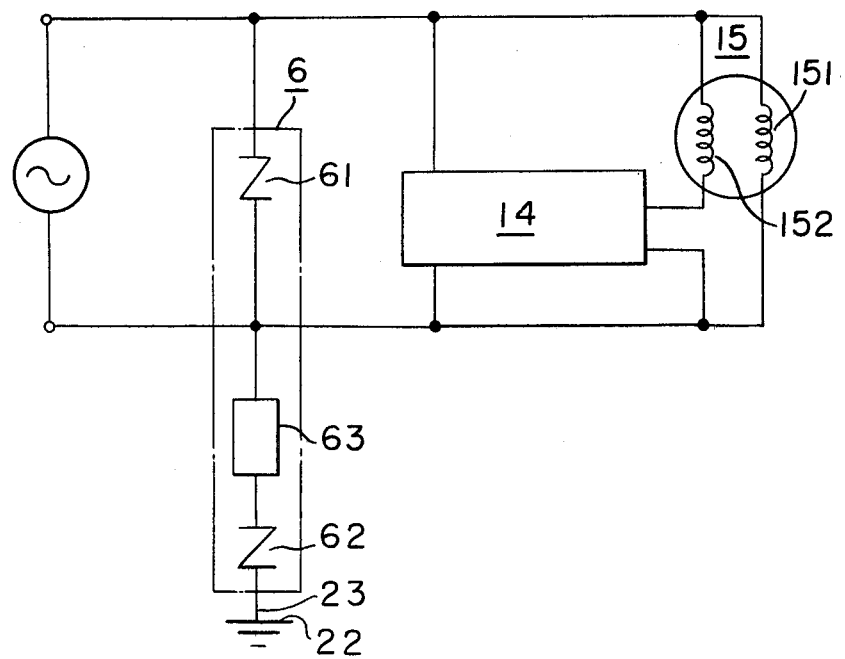
FIG. 4 is a schematic electric diagram of the mold type motor shown in FIG. 1.

In FIGS. 1 and 4, a stator (1) is made of a stator iron core (2) and a stator coil (15) (FIG. 4), with a stainless steel cylinder (3) (can) fitted to the inner wall of the stator; a molded resin frame (4) made of a polyester resin or a vinyl ester resin covers the outer surface and side surface of the stator iron core (2) and a coil end (5) of the stator coil; a surge absorber unit (6) includes a pair of surge absorber members (61), (62) (for example, plural layers of voltage dependent resistor elements made of mainly zinc oxide which are held in a ceramic tube) and a resistor element (63) as shown in FIG. 4. A connector (7) on the lead wire side is held on the top of the molded resin frame (4). Lead wires (8) and the surge absorber unit (6) are connected to the connector. A plurality of screw sockets (9) are embedded in both the ends of the molded resin frame (5) to fasten bracket (10) described below.

A pair of molded resin (10), (11) brackets are made of a material the same as that of the molded resin frame (4) a lightning feeding cable (12) is connected to a connector (13) in the cable side which is held in the upper bracket (10) in the pump side.

An electronic starting switch unit (14) is held in the bracket (10) in the pump side so as to close a circuit when the motor is stopped and to open the circuit, after the motor reaches a predetermined speed, so that an auxiliary coil (152) (FIG. 4) is separated from a main coil (152) connected in parallel to the auxiliary coil.

The reference numerals (16), (17) respectively designate fastening bolts, (18) a sleeve bearing, (19) designates a thrust bearing, (20) a rotor, (21) designates an inner pressure adjusting unit, and (22) a ground terminal held in the molded resin frame and the ground terminal is connected through a lead wire (23) to the surge absorber unit (6). A non-freezing liquid such as a propylene glycol is sealed in the can (3).

In the embodiment described above, both the surge absorber unit and the ground terminal are embedded in the molded resin frame whereby the number of parts can be small to allow an easy assembling operation.

Figure 5:
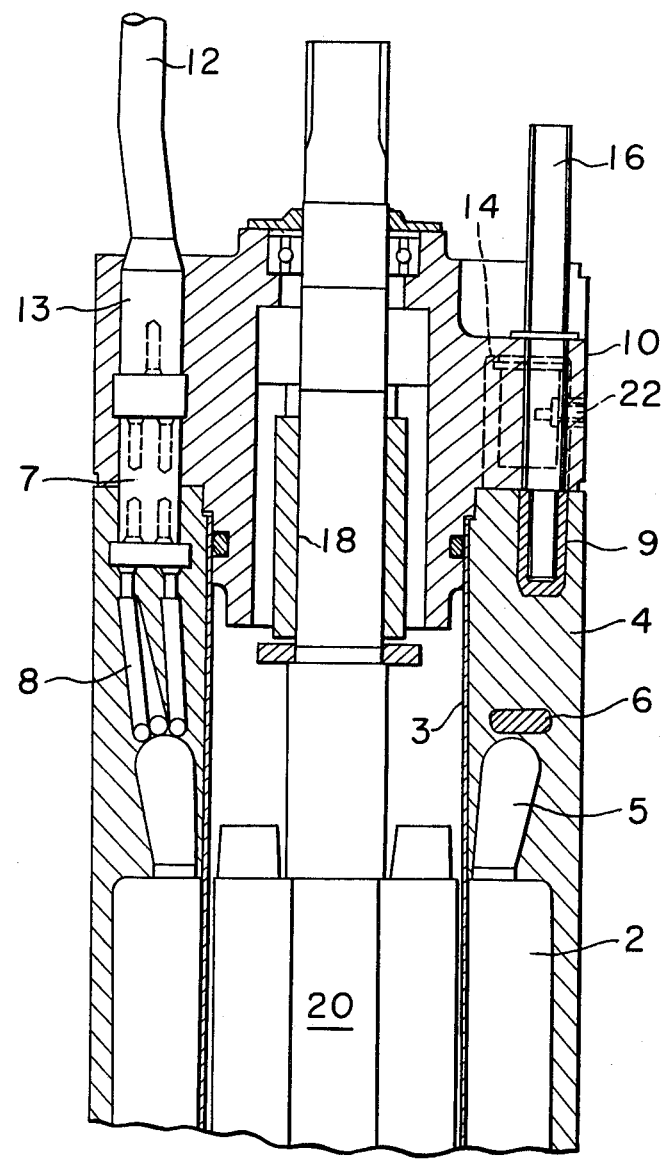
FIG. 5 is a sectional view of another embodiment of the mold type motor of the present invention.

FIGS. 5 and 6 illustrate another embodiment of the present invention. The structure of the mold type motor is substantially the same as the first embodiment except that a terminal plate (131) is provided to a connector (13) on the cable side to connect with a electronic starting switch unit (14) and a ground terminal (22) through a lead wire (23). A connector pin (not shown) may be provided in the connector (7) to connect the ground terminal of the surge absorber member (62), shown in FIG. 4, of the surge absorber unit 6.

FIGS. 7 to 9 illustrate a separate embodiment of the present invention. The structure of the mold type motor is also substantially the same as that of the embodiments described above except that at least one screw socket (9) is connected through the lead wire (23) to the surge absorber unit (6). In the embodiment, no ground terminal is provided, but the fastening bolt connected to the screw socket extends out of the bracket and serves as a ground terminal.

As described above, in accordance with the present invention, the outer surface of a stator is entirely covered by a molded resin frame and a pair of brackets are connected to both ends of the frame whereby flanges formed by welding at the outer and inner ends of cylinders can be eliminated to reduce the number of parts and eliminate machining operations for forming the fitting portion of the cylinders thereby reducing manufacturing cost.

I claim:

1. In a mold type motor comprising a molded resin frame covering the surfaces of a stator iron core and a coil end and molded resin brackets detachably fitted on the end openings of said molded resin frame, an improvement which comprises a surge absorber unit including a pair of surge absorber members each constructed of a plural layer of voltage dependent resistor elements, wherein said surge absorber unit is embedded in said molded resin frame with an electrical connection to a ground terminal embedded in said molded resin frame.

2. In a mold type motor comprising a molded resin frame covering the surfaces of a stator iron core and a coil end and molded resin brackets detachably fitted on the end openings of said molded resin frame, an improvement which comprises a surge absorber unit including a pair of surge absorber members each constructed of a plural layer of voltage dependent resistor elements, wherein said surge absorber unit is embedded in said molded resin frame with an electrical connection to a ground terminal embedded in one of said brackets.

3. In a mold type motor comprising a molded resin frame covering the surfaces of a stator iron core and a coil end and molded resin brackets detachably fitted on the end openings of said molded resin frame, an improvement which comprises a surge absorber unit including a pair of surge absorber members each constructed of a plural layer of voltage dependent resistor elements, wherein said surge absorber unit is embedded in said molded resin frame with an electrical connection to at least one screw socket for holding a fastening bolt for one of said brackets.

* * * * *